(12) United States Patent
You (10) Patent No.: US 9,531,763 B2
(45) Date of Patent: Dec. 27, 2016

(54) APPARATUS AND METHOD FOR REPRODUCING CONTENTS USING DIGITAL LIVING NETWORK ALLIANCE IN MOBILE TERMINAL

(75) Inventor: Seung-Hyun You, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1431 days.

(21) Appl. No.: 12/902,362

(22) Filed: Oct. 12, 2010

(65) Prior Publication Data

US 2011/0087759 A1 Apr. 14, 2011

(30) Foreign Application Priority Data

Oct. 12, 2009 (KR) .................. 10-2009-0096625

(51) Int. Cl.
*H04L 29/06* (2006.01)
*H04L 12/28* (2006.01)

(52) U.S. Cl.
CPC ....... *H04L 65/1046* (2013.01); *H04L 12/2812* (2013.01); *H04L 65/4084* (2013.01)

(58) Field of Classification Search
None
See application file for complete search history.

(56) References Cited

U.S. PATENT DOCUMENTS

| | | | |
|---|---|---|---|
| 8,224,775 B2 * | 7/2012 | Schwartz et al. | 707/620 |
| 8,612,462 B2 | 12/2013 | Yoon et al. | |
| 2007/0011343 A1 * | 1/2007 | Davis et al. | 709/231 |
| 2009/0300679 A1 * | 12/2009 | Hiroi et al. | 725/40 |
| 2010/0088733 A1 * | 4/2010 | Chan et al. | 725/80 |

FOREIGN PATENT DOCUMENTS

KR 10-2009-0087641 A 8/2009

* cited by examiner

*Primary Examiner* — Joseph Greene
(74) *Attorney, Agent, or Firm* — Jefferson IP Law, LLP (57) ABSTRACT

An apparatus and a method for reproducing contents using a Digital Living Network Alliance (DLNA) network are provided. The apparatus includes a Digital Media Server (DMS), a Digital Media Controller (DMC), and a Digital Media Renderer (DMR). The DMS provides contents stored in advance. The DMC selects contents according to an operation of the DMS, and reproduces the selected contents. The DMR reproduces contents under control the DMC.

14 Claims, 5 Drawing Sheets

FIG.1

(RELATED ART)

APPARATUS AND METHOD FOR REPRODUCING CONTENTS USING DIGITAL LIVING NETWORK ALLIANCE IN MOBILE TERMINAL

PRIORITY

This application claims the benefit under 35 U.S.C. §119 (a) of a Korean patent application filed in the Korean Intellectual Property Office on Oct. 12, 2009 and assigned Serial No. 10-2009-0096625, the entire disclosure of which is hereby incorporated by reference.

BACKGROUND OF THE INVENTION

1. Field of the Invention

The present invention relates to an apparatus and a method for reproducing contents using a Digital Living Network Alliance (DLNA) technology. More particularly, the present invention relates to an apparatus and a method for reproducing contents by simultaneously reproducing the contents while the contents are reproduced between mobile terminals, based on the DLNA.

2. Description of the Related Art

Recently, as a mobile terminal evolves, functions that enable wireless voice communication and information exchange have become a necessity in the mobile terminal. In early mobile terminals, the mobile terminal was simply recognized as a product that can be carried and enables wireless communication. As technology continues to develop and wireless Internet was introduced, the mobile terminal became used for not only the purpose of simple telephone communication or schedule management but also for the purpose to provide functions such as games, remote controlling using short distance communication, and image capturing by a mounted digital camera. Accordingly, the mobile terminal's utilization range is widened and meets a user's desire.

Furthermore, the mobile terminal provides a DLNA function for sharing a plurality of contents provided from information apparatuses (e.g., a TeleVision (TV), a Video Cassette Recorder (VCR), a digital camera, an audio system, and the like.) inside a household.

The DLNA enables users to enjoy digital media contents by allowing all apparatuses inside a household to share the digital media contents (e.g., photos, music, moving images, and the like.) stored in an apparatus in a personal area such as a mobile terminal.

Figure 1:
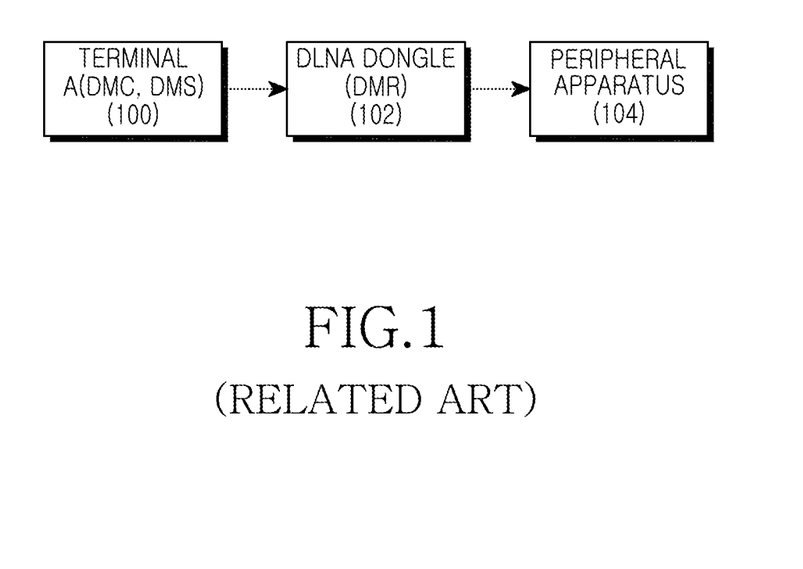
FIG. 1 illustrates a process for reproducing contents using a Digital Living Network Alliance (DLNA) in a mobile terminal according to the related art.

FIG. 1 illustrates a process for reproducing contents using a DLNA in a general mobile terminal of the related art.

Referring to FIG. 1, the mobile terminal (terminal A) 100 performs functions of a Digital Media Controller (DMC) and a Digital Media Server (DMS).

That is, the mobile terminal 100 performs a DMS function for providing a plurality of digital contents stored in advance to a user of the mobile terminal, and a DMC function for allowing the user to select contents through the DMS function, and then controlling to reproduce the selected contents.

The mobile terminal 100 for reproducing contents transmits the selected contents to a DLNA dongle 102 via short distance communication. The DLNA dongle 102 that has received the contents connects to a peripheral apparatus 104 such as a TV and a projector using an exclusive cable to reproduce relevant contents. Accordingly, the DLNA dongle 102 and the peripheral apparatus 104 perform a Digital Media Render (DMR) function that reproduces the contents.

The above-described method has problems in which a peripheral apparatus is required for reproducing relevant contents when reproducing the contents using the DLNA, and a DLNA dongle is required for receiving contents selected by a user.

Therefore, a need exists for an apparatus and a method for reproducing contents between mobile terminals.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reproducing contents using a Digital Living Network Alliance (DLNA) network in a mobile terminal.

Another aspect of the present invention is to provide an apparatus and a method for enabling contents reproduction using a DLNA network without a unit for receiving contents in a mobile terminal.

Still another aspect of the present invention is to provide an apparatus and a method for simultaneously reproducing the same contents in a plurality of mobile terminals.

In accordance with an aspect of the present invention, an apparatus for reproducing contents using a DLNA network in a mobile terminal is provided. The apparatus includes a Digital Media Server (DMS) for providing contents stored in advance, a Digital Media Controller (DMC) for selecting contents according to an operation of the DMS, and reproducing the selected contents, and a Digital Media Renderer (DMR) for reproducing contents under control of the DMC.

In accordance with another aspect of the present invention, a method for reproducing contents using a DLNA network in a mobile terminal is provided. The method includes providing, by a DMS, contents stored in advance, selecting, by a DMC, contents according to an operation of the DMS, and reproducing the selected contents, and reproducing, by a DMR, contents under control of the DMC.

In accordance with still another aspect of the present invention, an apparatus for reproducing contents in a DLNA network is provided. The apparatus includes a first terminal for encoding contents to be reproduced to provide the same to a second terminal, and for allowing a reproduction point of the contents to coincide with a reproduction point at the second terminal to simultaneously reproduce the contents, and the second terminal for decoding the contents provided by the first terminal and for allowing the reproduction point of the contents to coincide with the reproduction point at the second terminal to simultaneously reproduce the contents.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for reproducing contents using a Digital Living Network Alliance (DLNA) network that allows simultaneous reproduction of the same contents in a plurality of mobile terminals.

Figure 2:
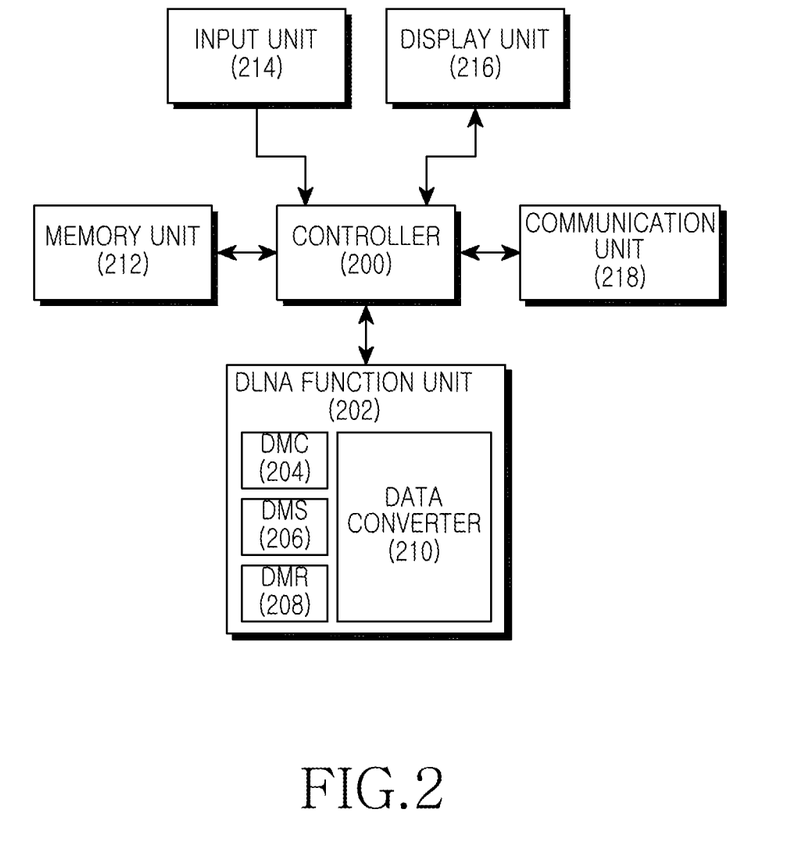
FIG. 2 is a block diagram illustrating a mobile terminal for reproducing contents using a DLNA network according to an exemplary embodiment of the present invention.

FIG. 2 is a block diagram illustrating a mobile terminal for reproducing contents using a DLNA network according to an exemplary embodiment of the present invention.

Referring to FIG. 2, the mobile terminal may be a mobile terminal that requests contents reproduction using the DLNA network.

The mobile terminal may include a controller 200, a DLNA function unit 202, a memory unit 212, an input unit 214, a display unit 216, and a communication unit 218. The DLNA function unit 202 may include a Digital Media Controller (DMC) 204, a Digital Media Server (DMS) 206, a Digital Media Renderer (DMR) 208, and a data converter 210. The mobile terminal may include additional units. Similarly, the functionality of two or more of the above units may be integrated into a single component.

The controller 200 of the mobile terminal controls an overall operation of the mobile terminal. For example, the controller 200 performs processes and controls for voice communication and data communication. In addition to the general operations, in case of reproducing contents using a DLNA network, the controller 200 selects another mobile terminal (i.e., peripheral apparatus) existing in a neighborhood, and allows the mobile terminal existing in the neighborhood to simultaneously reproduce the contents that the mobile terminal desires to reproduce.

In an exemplary implementation, the controller 200 selects contents to be reproduced and encodes the contents in order to transmit the contents to another mobile terminal.

The DLNA function unit 202 encodes contents that a user desires to reproduce under control of the controller 200, and transmits the encoded contents to another mobile terminal existing in the neighborhood to simultaneously reproduce the contents together with a mobile terminal existing in the neighborhood.

An operation of the DLNA function unit 202 is described in more detail below.

The DLNA function unit 202 allows the DMS 206 to output a list of contents that a user desires to reproduce to provide a list of contents that the user of the mobile terminal may reproduce, thereby performing a function of a digital media server.

Thereafter, the DLNA function unit 202 allows the DMC 204 to determine contents that the user of the mobile terminal has selected to reproduce the relevant contents, and then allows the data converter 210 to encode the selected contents as data to be transmitted to a mobile terminal existing in the neighborhood.

Furthermore, the DLNA function unit 202 allows the DMR 208 to finally reproduce the selected contents, thereby performing a function of a digital media controller.

The DMS 206 of the DLNA function unit 202 provides a list of contents stored in advance under control of the DLNA function unit 202, and the DMC 204 determines contents selected from the list to control the contents.

In addition, the DMR 208 reproduces the selected contents under control of the DLNA function unit 202, and the data converter 210 encodes the selected data according to an exemplary embodiment of the present invention. Here, the data converter 210 that encodes the contents is an element of the mobile terminal that requests contents reproduction. In a case where the data converter 210 is an element of a peripheral apparatus requested to reproduce contents, the data converter 210 decodes received contents, that is, decodes the encoded contents as reproducible contents.

The memory unit 212 includes, for example, Read Only Memory (ROM), Random Access Memory (RAM), flash ROM, and the like. The ROM stores microcodes of programs for processes and controls of the controller 200 and the DLNA function unit 202, and various reference data.

The RAM serves as a working memory of the controller 200 and stores temporary data occurring during execution of various programs. The flash ROM stores various updatable data for storage such as a phonebook, calling messages, and received messages.

The input unit 214 includes a plurality of function keys such as numerical key buttons of 0 to 9, a menu button, a cancel button, an OK button, a TALK button, an END button, an Internet access button, navigation key buttons, letter input keys, and the like. The input unit 214 provides key input data (e.g., input for selecting contents to be reproduced) corresponding to a key pressed by a user to the controller 200. The keys are merely examples of keys which may make up the input unit 214. The input unit may include additional or different keys, or different input mechanisms through which the user supplies input to the mobile terminal The display unit 216 displays status information generated during an operation of the mobile terminal, a limited number of letters, a large amount of moving images and still images, and the like. The display unit 216 may be a color Liquid Crystal Display (LCD), an Active Mode Organic Light Emitting Diode (AMOLED), and the like.

The communication unit 218 transmits/receives a Radio Frequency (RF) signal of data input/output via an antenna (not illustrated). For example, during transmission, the communication unit 218 channel-codes and spreads data to be transmitted, and then performs an RF process on the signal to transmit the signal. During reception, the communication unit 218 converts a received RF signal into a baseband signal, and despreads and channel-decodes the baseband signal to recover data. In an exemplary embodiment of the present invention, the communication unit 218 transmits/receives encoded contents.

The function of the DLNA function unit 202 may be performed by the controller 200 of the mobile terminal. A separate configuration and illustration of the DLNA function unit 202 are for exemplary purpose only and for convenience in description, and is not limiting thereto. For example, all of the functions of the DLNA function unit 202 may be processed by the controller 200.

An exemplary apparatus for reproducing contents using a DLNA network that allows a plurality of mobile terminals to simultaneously reproduce the same contents has been described above. An exemplary method for allowing a plurality of mobile terminals to simultaneously reproduce the same contents using the above apparatus according to an exemplary embodiment of the present invention is described below.

Figure 3:
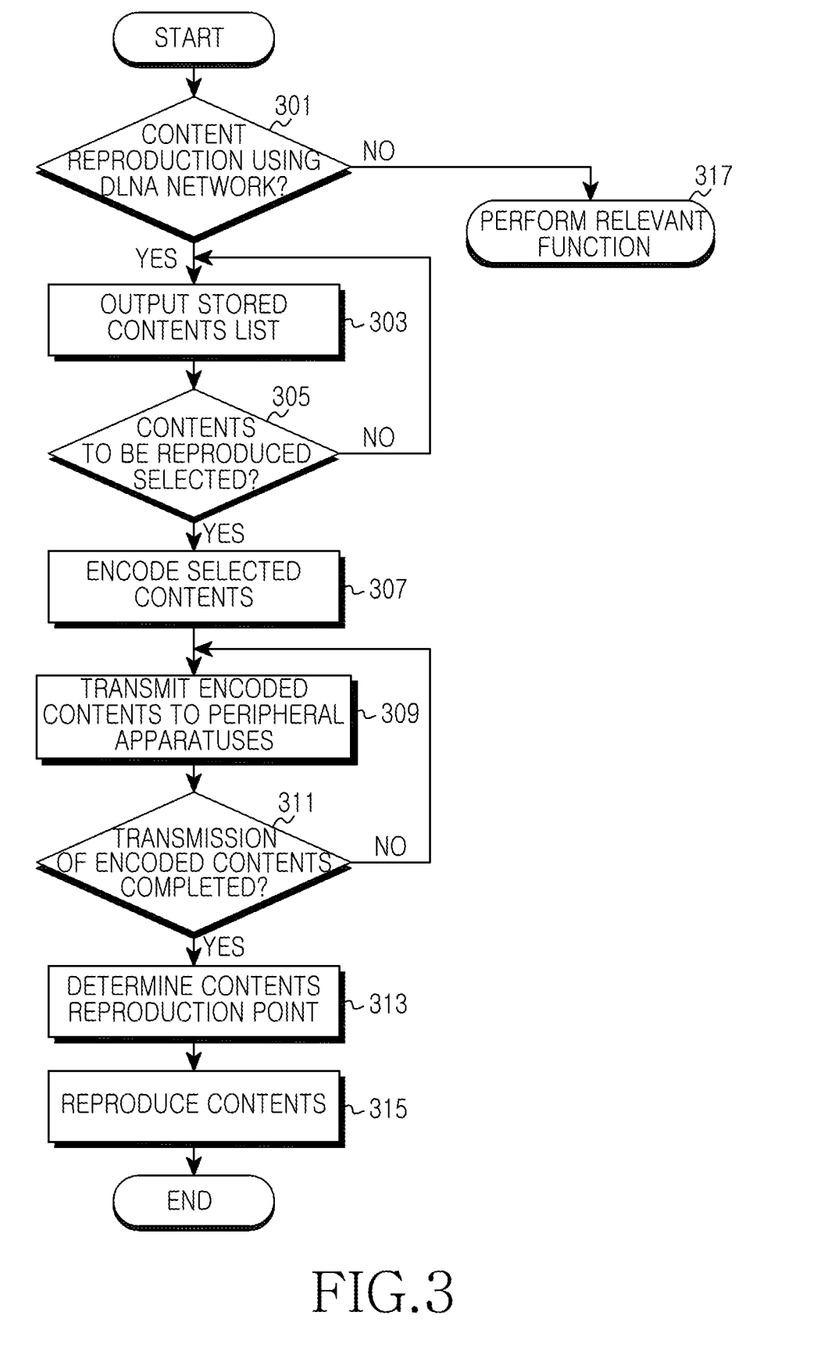
FIG. 3 is a flowchart illustrating a process for requesting contents reproduction using a DLNA network in a mobile terminal according to an exemplary embodiment of the present invention.

FIG. 3 is a flowchart illustrating a process for requesting contents reproduction using a DLNA network in a mobile terminal according to an exemplary embodiment of the present invention.

Referring to FIG. 3, unlike a conventional mobile terminal which performs a DMC function and a DMS function, the mobile terminal denotes a mobile terminal that additionally performs a DMR function besides the DMC function and the DMS function.

To request contents reproduction using a DLNA network, the mobile terminal determines whether an event for reproducing contents using the DLNA network occurs in step 301. Here, the determination of whether the event for reproducing contents using the DLNA network occurs is to access a digital apparatus (e.g., Audio Video (AV) apparatus, a computer, a wireless terminal, and the like) connected via a home network to determine whether an event for reproducing digital contents occurs.

If it is determined that the event for reproducing contents using the DLNA network does not occur in step 301, the mobile terminal performs a relevant function (e.g., an idle mode) in step 317.

In contrast, if it is determined that the event for reproducing contents using the DLNA network occurs in step 301, the mobile terminal outputs a contents list, which is an item of contents stored in advance in step 303, thereby performing a function of a digital media server.

The mobile terminal starts an operation of the digital media controller by determining whether contents to be reproduced are selected by a user of the mobile terminal in step 305.

The mobile terminal performs an encoding process in order to transmit the contents selected in step 305 to a peripheral apparatus in step 307.

Here, the mobile terminal may provide a solution to contents reproduction that is not-allowed which is caused by a contents format that cannot be supported by the peripheral apparatus by converting the selected contents to a contents format that is reproducible by the peripheral apparatus, and encoding the same.

The mobile terminal transmits the contents encoded in step 307 to a peripheral apparatus that is to reproduce the contents in step 309, and determines whether transmission of the encoded contents is completed in step 311.

If it is determined that the transmission of the encoded contents is not completed in step 311, the mobile terminal re-performs the process of step 309 to transmit the contents.

In contrast, if it is determined that the transmission of the encoded contents is completed in step 311, the mobile terminal determines a contents reproduction point in step 313.

Here, the contents reproduction point is a point at which the peripheral apparatus that has received the encoded contents and the mobile terminal simultaneously reproduce the contents. The contents reproduction point may be a point requested by the user of the mobile terminal to reproduce the contents, or a point after a preset time after the transmission of the contents.

The mobile terminal reproduces the contents, that is, the contents selected by the user of the mobile terminal in step 315.

At this point, the mobile terminal requests the DMR to reproduce the contents, thereby ending the function of the digital media server, and then allows the DMR that has received the request to reproduce the relevant digital contents.

Thereafter, the mobile terminal ends the process.

Figure 4:
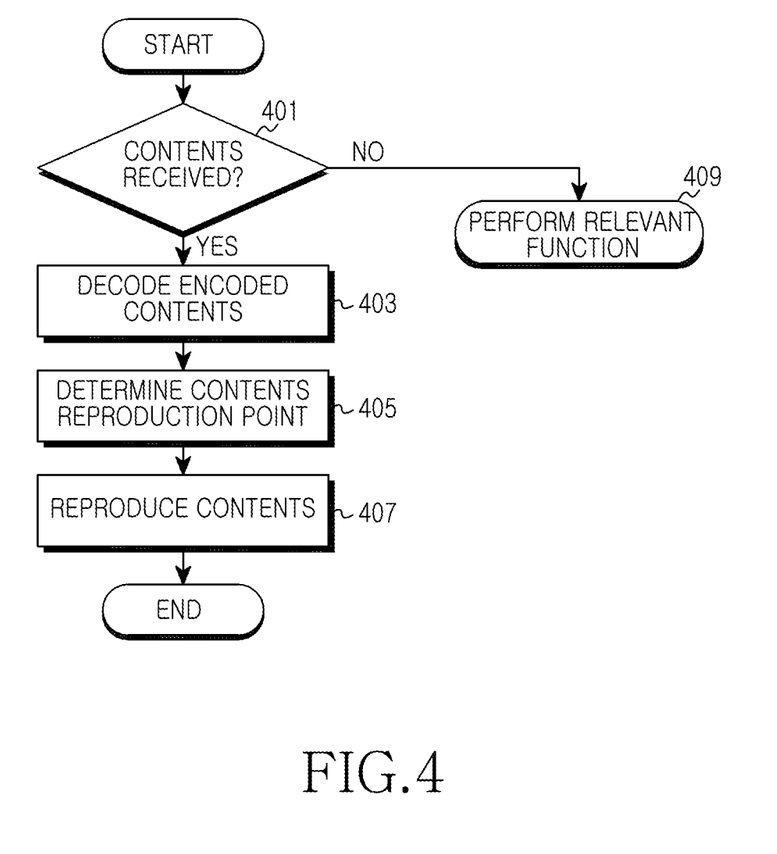
FIG. 4 is a flowchart illustrating a process for reproducing contents using a DLNA network in a peripheral apparatus according to an exemplary embodiment of the present invention.

FIG. 4 is a flowchart illustrating a process for reproducing contents using a DLNA network in a peripheral apparatus according to an exemplary embodiment of the present invention.

Referring to FIG. 4, the peripheral apparatus determines whether contents are received from the mobile terminal in step 401. The contents are contents transmitted by the mobile terminal, and may be contents encoded suitable for the format supported by the peripheral apparatus.

If it is determined that the contents are not received in step 401, the peripheral apparatus performs a relevant function (e.g., an idle mode) in step 409.

In contrast, if it is determined that the contents are received in step 401, the peripheral apparatus decodes the received contents in step 403, and determines a reproduction point of the decoded contents in step 405.

Here, the contents reproduction point is a point at which the mobile terminal that has provided the encoded contents and the peripheral apparatus simultaneously reproduces the contents. The contents reproduction point may be a point requested by the user of the mobile terminal to reproduce the contents, or a point after a preset time after the reception of the contents.

The peripheral apparatus reproduces the contents in step 407. At this point, the peripheral apparatus and the mobile terminal that has transmitted the contents reproduce the same contents simultaneously.

Thereafter, the peripheral apparatus ends the process.

Figure 5:
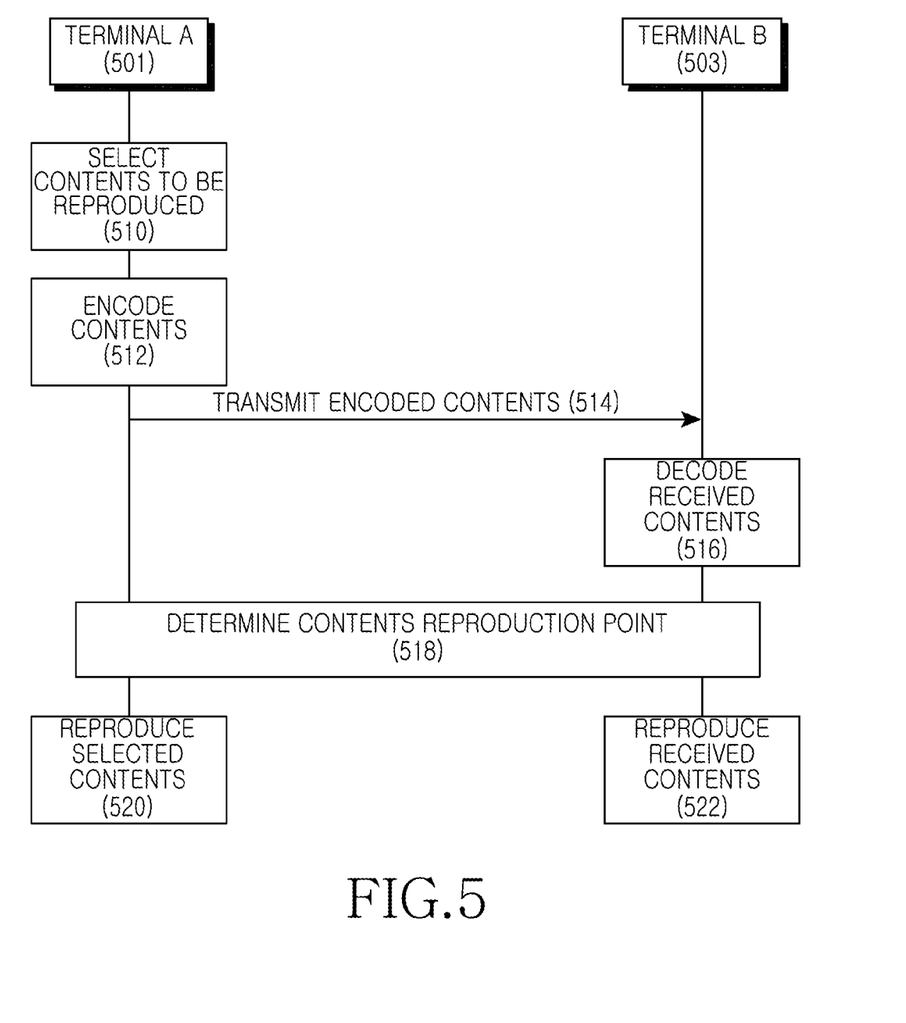
FIG. 5 is a diagram illustrating a process for reproducing contents using a DLNA network according to an exemplary embodiment of the present invention.

FIG. 5 is a diagram illustrating a process for reproducing contents using a DLNA network according to an exemplary embodiment of the present invention.

Referring to FIG. 5, the DLNA network may include a terminal A 501 and a terminal B 503. Unlike a conventional terminal which performs a DMC function and a DMS function, the terminal A denotes a terminal that additionally performs a DMR function besides the DMC function and the DMS function.

The terminal A 501 accesses a digital apparatus (e.g., an AV apparatus, a computer, a wireless terminal, and the like) connected via a home network to determine whether an event for reproducing digital contents, and outputs a contents list, which is an item of contents stored in advance, thereby performing the function of a digital media server. The terminal A 501 also determines whether contents to be reproduced are selected by a user in step 510, thereby starting an operation of a digital media controller.

The terminal A 501 performs an encoding process in order to transmit the selected contents to the terminal B 503 in step 512, and then transmits the encoded contents to the terminal B 503 that is to reproduce the contents in step 514.

Accordingly, the terminal B 503 that has received the encoded contents decodes the received contents to perform preparation for contents reproduction in step 516.

At this point, the terminal A 501 may provide a solution to a contents reproduction that is not-allowed which is caused by a contents format that cannot be supported by the terminal B 503 by converting the selected contents to a contents format that is reproducible by the terminal B 503, and encoding the same.

Thereafter, the terminal A 501 and the terminal B 503 determine a point at which the contents selected by the user are to be reproduced in step 518.

Here, the point at which the contents are to be reproduced denotes a point at which the terminal A 501 and the terminal B 503 are to reproduce the same contents simultaneously.

To reproduce the contents simultaneously, the terminal A 501 reproduces the contents selected by the user at the point in step 520, and the terminal B 503 reproduces the received contents at the point in step 522.

As described above, according to exemplary embodiments of the present invention, contents selected by a user are encoded and transmitted to other mobile terminals, so that a plurality of mobile terminals may reproduce the same contents simultaneously. Therefore, the mobile terminal can directly reproduce the contents without using a separate apparatus for contents reproduction when a conventional mobile terminal reproduces the contents using a DLNA network.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal, for reproducing contents using a Digital Living Network Alliance (DLNA) network, the terminal comprising:
   a Digital Media Server (DMS) for providing contents stored in advance;
   a Digital Media Controller (DMC) for selecting contents to be reproduced according to an operation of the DMS; and
   a Digital Media Renderer (DMR) for reproducing the selected contents under control of the DMC,
   wherein the DMS, DMC and DMR are arranged in the mobile terminal.

2. The terminal of claim 1, wherein after selecting the contents to be reproduced, the DMC encodes the selected contents and transmits the selected contents to a peripheral apparatus existing in a neighborhood.

3. The terminal of claim 2, wherein the DMC converts the selected contents into a format supported by the peripheral apparatus.

4. The terminal of claim 1, wherein the DMR reproduces the same contents as a peripheral apparatus.

5. The terminal of claim 4, wherein the DMR determines a reproduction point for reproducing the contents simultaneously with the peripheral apparatus, and reproduces the contents simultaneously with the peripheral apparatus.

6. The terminal of claim 2, wherein the peripheral apparatus that has received the encoded contents decodes the received contents to reproduce the contents simultaneously with the mobile terminal.

7. A method for reproducing contents using a Digital Living Network Alliance (DLNA) network in a mobile terminal, the method comprising:
   providing, by a Digital Media Server (DMS), contents stored in advance;
   selecting, by a Digital Media Controller (DMC), contents according to an operation of the DMS; and
   reproducing, by a Digital Media Renderer (DMR), the selected contents under control of the DMC,
   wherein the DMS, DMC and DMR are arranged in the mobile terminal.

8. The method of claim 7, wherein the selecting of the contents comprises:
   selecting the contents to be reproduced; and
   encoding the selected contents to transmit the same to a peripheral apparatus existing in a neighborhood.

9. The method of claim 8, wherein the selecting of the contents further comprises converting the selected contents into a format supported by the peripheral apparatus.

10. The method of claim 7, wherein the reproducing of the selected contents comprises reproducing the same contents as a peripheral apparatus.

11. The method of claim 10, wherein the reproducing of the selected contents further comprises:
   determining a reproduction point for reproducing the contents simultaneously with the peripheral apparatus; and
   reproducing the contents simultaneously with the peripheral apparatus at the determined reproduction point.

12. The method of claim 8, wherein the peripheral apparatus that has received the encoded contents decodes the received contents to reproduce the contents simultaneously with the mobile terminal.

13. An apparatus for reproducing contents in a Digital Living Network Alliance (DLNA) network, the apparatus comprising:
   a first terminal for encoding contents to be reproduced to provide the same to a second terminal, and for allowing a reproduction point of the contents to coincide with a reproduction point at the second terminal to simultaneously reproduce the contents; and
   the second terminal for decoding the contents provided by the first terminal and for allowing the reproduction point of the contents to coincide with the reproduction point at the second terminal to simultaneously reproduce the contents, wherein each one of the first terminal and the second terminal comprises a Digital Media Server (DMS), a Digital Media Controller (DMC), and a Digital Media Renderer (DMR).

14. The apparatus of claim 13, wherein the second terminal comprises a plurality of digital apparatuses located in a neighborhood of the first terminal.

* * * * *